US007713446B2

(12) United States Patent
Epstein et al.

(10) Patent No.: US 7,713,446 B2
(45) Date of Patent: May 11, 2010

(54) SYNTHESIS OF NANOFIBERS OF POLYANILINE AND SUBSTITUTED DERIVATIVES

(75) Inventors: Arthur J. Epstein, Bexley, OH (US); Nan-Rong Chiou, Columbus, OH (US)

(73) Assignee: The Ohio State Univeristy, Columbus, OH (US)

( * ) Notice: Subject to any disclaimer, the term of this patent is extended or adjusted under 35 U.S.C. 154(b) by 8 days.

(21) Appl. No.: 12/103,163

(22) Filed: Apr. 15, 2008

(65) Prior Publication Data
US 2008/0197326 A1 Aug. 21, 2008

Related U.S. Application Data

(62) Division of application No. 11/168,751, filed on Jun. 28, 2005, now Pat. No. 7,374,703.

(60) Provisional application No. 60/583,570, filed on Jun. 28, 2004.

(51) Int. Cl.
*H01B 1/00* (2006.01)
*C08G 73/06* (2006.01)
(52) U.S. Cl. ...................... 252/500; 528/423
(58) Field of Classification Search .......... 252/500; 528/423
See application file for complete search history.

(56) References Cited

U.S. PATENT DOCUMENTS

| 4,898,921 | A | | 2/1990 | Humphrey et al. |
| 5,232,631 | A | * | 8/1993 | Cao et al. ............... 252/500 |
| 5,256,730 | A | | 10/1993 | Gan et al. |
| 5,489,400 | A | * | 2/1996 | Liu et al. ............... 252/500 |
| 5,792,830 | A | | 8/1998 | Noding et al. |
| 5,840,214 | A | * | 11/1998 | Kinlen ................. 252/500 |
| 6,030,551 | A | | 2/2000 | Ho et al. |
| 6,150,032 | A | * | 11/2000 | Yang et al. ............. 428/457 |
| 6,509,502 | B1 | | 1/2003 | Jussila et al. |
| 6,586,565 | B2 | * | 7/2003 | Palaniappan ........... 528/422 |
| 2005/0131139 | A1 | | 6/2005 | Kaner et al. |

FOREIGN PATENT DOCUMENTS

| EP | 0300082 | * | 1/1989 |
| WO | WO 98/04611 | * | 2/1998 |

OTHER PUBLICATIONS

International Search Report mailed Dec. 1, 2005 corresponding to International Application No. PCT/US05/22717.
S.Q.Jiao, et al., *Influence of the Preparation Conditions on the Morphology of Polyaniline Electrodeposited by the Pulse Galvanostatic Method*, Journal of Applied Polymer Science, vol. 94, 1389-1394 (2004).

(Continued)

*Primary Examiner*—Mark Kopec
*Assistant Examiner*—Jaison P Thomas
(74) *Attorney, Agent, or Firm*—Fay Sharpe LLP

(57) ABSTRACT

Novel, simple methods are presented directed to the synthesis of nanofibers of polyaniline and substituted derivatives. The production of these fibers is achieved via various methods by controlling the concentration of aniline monomer or substituted aniline derivatives or an oxidant in the reaction medium and maintaining said concentration at a level much lower than conventional polyaniline synthesis methods. Methods are disclosed relating to the use of a permeable membrane to control the release of a monomer and/or oxidant as well as a bulk polymerization method.

26 Claims, 12 Drawing Sheets

OTHER PUBLICATIONS

Yangxin Zhou, et al., *Fabrication and Electrical Characterization of Polyaniline-Based Nanofibers with Diameter below 30 nm*, Applied Physics Letters, vol. 83, No. 18, Nov. 3, 2003.

Hasegawa, A., *Study of Conducting Mechanism and Characterization of Polyaniline Composite Film Prepared by Diaphragm Method*, Kogukuin Daigaku Kenkyu Hokoku, 1994, ISSN: 0368-5098.

* cited by examiner

SYNTHESIS OF NANOFIBERS OF POLYANILINE AND SUBSTITUTED DERIVATIVES

CROSS REFERENCE TO RELATED APPLICATION

This application is a divisional of U.S. application Ser. No. 11/168,751, now U.S. Pat. No. 7,374,703, filed Jun. 28, 2005, which application claims priority from and the benefit of the filing date of U.S. Application Ser. No. 60/583,570, filed Jun. 28, 2004, and the disclosure of said prior applications are expressly incorporated herein by reference into the present specification.

BACKGROUND

The present exemplary embodiments relates to the synthesis of polyaniline and its substituted derivatives. It finds particular application in conjunction with the synthesis of conductive polyaniline nanofibers, and will be described with particular reference thereto. However, it is to be appreciated that the present exemplary embodiment is also amenable to other like applications such as other conductive and semiconductive polymers.

Electroconductive polymers have been subject to extensive research in recent years. Polymers which show electrical conductivity due to the structure of the polymeric chain may be used to replace metal conductors and semiconductor materials in many applications. Significant applications include providing a conductive pathway in circuits and devices, displays, lighting, chemical, biological, environmental and medical sensors, anticorrosive coatings, scaffolds for tissue growth, antistatic shielding (ESD) and electromagnetic shielding (EMI).

In the group of intrinsically electroconductive polymers, one technically promising polymer is polyaniline. Polyaniline has emerged as one of the most promising conducting polymers and can be used in a variety of applications, such as paint, antistatic protection, electromagnetic radiation protection, electro-optic devices such as liquid crystal devices (LCDs), light emissive displays, lighting and photocells, transducers, circuit boards, chemical, biological, environmental and medical sensors, anticorrosive coatings, scaffolds for tissue growth, etc.

Polyaniline is one of a class of conductive polymers, which can be synthesized through either chemical polymerization or electrochemical polymerization. Polyaniline is conventionally prepared by polymerizing an aniline monomer. The nitrogen atoms of monomer units are bonded to the para-carbon in the benzene ring of the next monomer unit. In chemical preparation, bulk polymerization is the most common method to make polyaniline. As has been previously reported, conventional bulk chemical synthesis produces granular polyaniline.

Polyaniline nanofibers have attracted much attention in the field of nanotechnology. There have been recent reports of a variety of chemical methods used in order to obtain polyaniline nanofibers. These approaches include use of templates or surfactants, electrospinning, coagulating media, interfacial polymerization, seeding, and oligomer-assisted polymerization.

BRIEF DESCRIPTION

In the present application, a novel, simple method is introduced to prepare polyaniline nanofibers. In one embodiment, a permeable tubing or membrane is used to steadily control the release of aniline monomer into an oxidant solution (or vice versa) to form polyaniline nanostructures. After polymerization, polyaniline nanofibers are collected directly outside the tubing or inside the tubing without any further treatment to obtain free-standing nanofibers.

In a second embodiment, polyaniline nanofibers can be obtained from conventional bulk chemical polymerization under careful control of polymerization conditions. This is accomplished by introducing aniline monomer solution into an oxidant solution (or vice versa) and polymerizing at very low concentrations.

In a third embodiment, there is provided a field effect device having an active channel including a polyaniline or substituted polyaniline nanofiber network in contact with a source electrode and a drain electrode.

DETAILED DESCRIPTION

Figure 1:
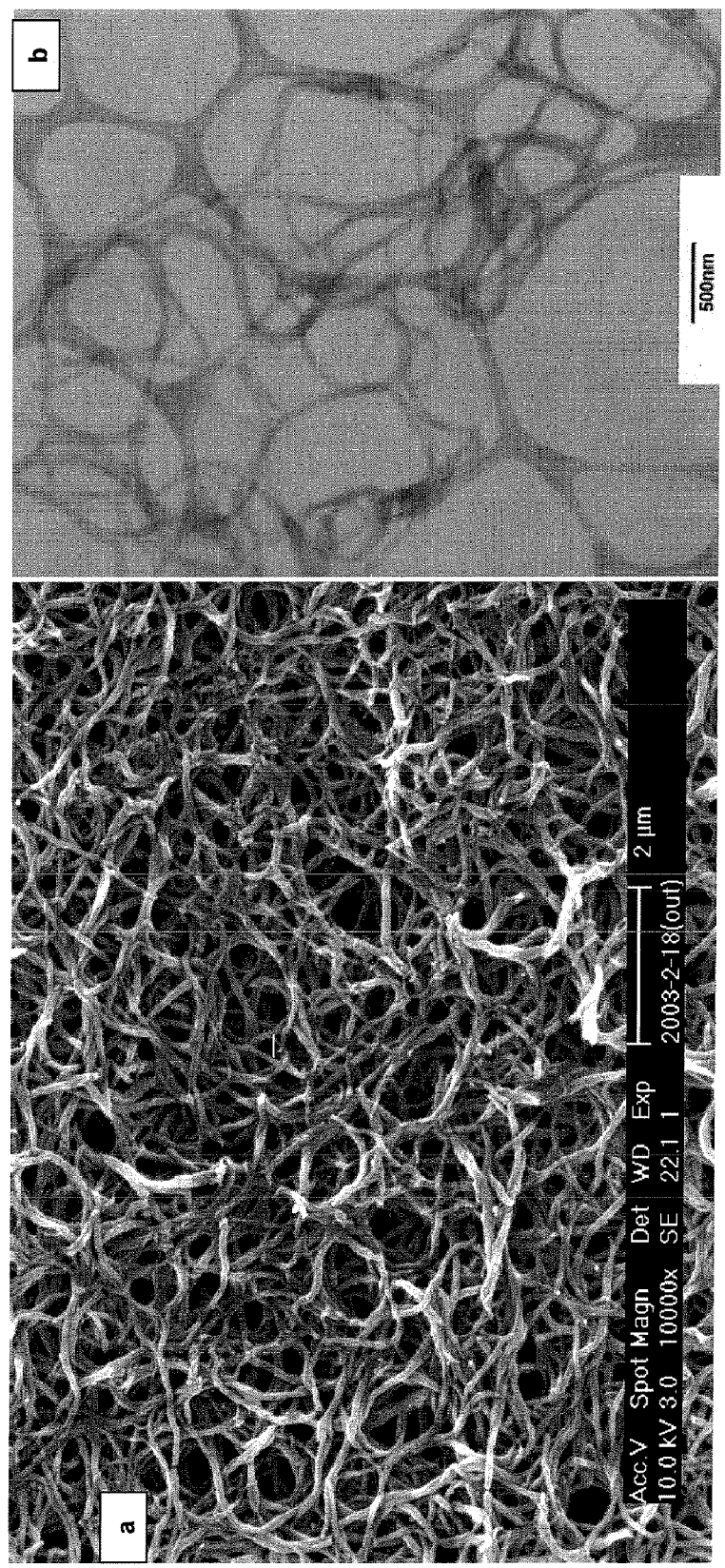
FIG. 1a is a scanning electron micrograph (SEM) of polyaniline/$CH_3SO_3^-$ nanofibers made by the first described method deposited on Si-wafer substrate with a thin layer coating of Au/Pd (scale bar=2 µm).
FIG. 1b is a transmission electron micrograph (TEM) of polyaniline/$CH_3SO_3^-$ nanofibers made by a first described method dispersed in deionized water. (scale bar=500 nm).

As stated above, the present exemplary embodiments are directed to the synthesis of polyaniline nanofibers. The production of these fibers is achieved via various methods by controlling the concentration of aniline monomer or an oxidant in the reaction medium and maintaining said concentration at a level much lower than conventional polyaniline synthesis methods. Although not intended to be limiting, excellent results are achieved with a concentration of monomer in a reaction solution of 10 millimoles or less. This control can be accomplished by various methods.

In a first embodiment, aniline monomer dissolved in an aqueous acid solution is separated from an aqueous oxidant/acid solution by a permeable membrane in a reaction chamber. The aniline monomer diffuses through the membrane at a controlled rate and is subsequently polymerized in the oxidant/acid solution according to known reactions. Alternately or in addition to diffusion of the aniline monomer, the oxidant can diffuse through the membrane. Polyaniline nanofibers will form and then precipitate out of aniline and oxidant solution and may be subsequently collected.

The permeable membrane may be any membrane through which the aniline monomer and/or oxidant can diffuse or otherwise pass through. Thus, various types of cellulose or other finely porous materials may be used as the membrane. Useful membranes may thus be made from, for example, regenerated cellulose, cellulose ester, or polyvinylidene difluoride. The arrangement of the membrane can vary depending on the size, shape, etc. of the reaction chamber, with the only provision being that it must separate the monomer from the oxidant.

In one specific embodiment, applicants have found that conventional regenerated cellulose dialysis tubing provides excellent results in that it adequately controls the diffusion of monomer(s) or oxidant(s) to enable the production of extremely fine polyaniline nanofibers. Thus, in this embodiment, aniline monomer in solution is placed in dialysis tubing, which is then sealed. The sealed tubing is then placed in a reaction chamber (such as a beaker) containing an oxidant in an acid solution. Alternately, the oxidant may be placed in the tubing with the aniline monomer in the reaction chamber.

In this embodiment, the pore size of the dialysis tubing may be changed to control the rate of diffusion of the aniline and/or the oxidant and thus its concentration in the reaction chamber. This control can be used to customize the size and configuration of the resulting polyaniline nanofibers, as described below. Applicants have found that a regenerated cellulose membrane (or tubing) with a molecular weight cut off (MWCO) of about 3500 to 60,000 provides excellent results. Nevertheless, other membranes with larger or smaller pore sizes may be used. Thus, cellulose ester membranes with MWCO of from 100 to 300,000 or polyvinylidene difluoride membranes with MWCO of from 250,000 to 1,000,000 are also suitable exemplary materials.

Polyaniline produced according to the process of this invention may be prepared from the polymerization of unsubstituted aniline or a substituted aniline monomer. In addition, dimers as well as oligomers having up to eight repeating aniline or substituted aniline units may also be used in the various embodiments. As used herein, any general description using the terms "aniline" is intended to refer to and encompass both substituted and unsubstituted aniline monomer, as well as dimers or oligomers thereof of up to eight units in length. Likewise, the term "polyaniline" is also intended to refer to and encompass polymers of both substituted and unsubstituted anilines unless specifically noted.

Exemplary substituted aniline monomers include those having the following formula:

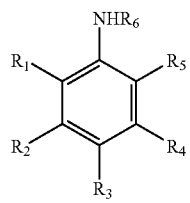

wherein, $R_1$, $R_2$, $R_3$, $R_4$, $R_5$, and $R_6$ are independently selected from the group consisting of: hydrogen atom, alkyl, alkoxy, alkylsulfonyl, arylsulfonyl, halogen, alkoxycarbonyl, alkythio, alkylsulfuryl, cycloalkyl, sulfonic, aryl or carboxylic substituted alkyl substituents.

Specific substituted anilines that may be amenable to the present processes include 2-aminobenzenesulfonic acid, 3-aminobenzenesulfonic acid, orthanilic acid, o-toluidine, m-toluidine, o-anisidine, m-anisidine, as well as polyhalogen anilines such as 2-fluoroaniline, 2-chloroaniline, 2-bromoaniline, 2-iodoaniline, 3-fluoroaniline, 3-chloroaniline, 3-bromoaniline, and 3-iodoaniline. In addition, it may be possible to use other monomers by modifying the disclosed processes including, for example, pyrrole, substituted pyrrole, thiophene, substituted thiophene and 3,4-ethylenedioxythiophene as well as the use of two or more monomers to produce a copolymer, such as aniline/pyrrole, aniline/touidine or aniline/anisidine. Specific nanofibers of both poly(-o-toluidine) and sulfonated polyaniline were successfully produced using the present processes.

In an aqueous polymerization medium, any conventional protonic acid or mixtures thereof may be used in the present embodiments. Both inorganic and organic acids may be used including chiral acids. Such acids for use in the polymerization of aniline are known and include, but are not limited to, protonic acids which can be used to form a complex with the aniline monomer and to make it possible for the aniline monomer to be dissolved in water. Exemplary acids include hydrochloric acid, hydrogen bromide, sulfuric acid, perchloric acid, nitric acid, phosphoric acid, phosphonic acid, trifluoromethanesulphonic acid, toluenesulphonic acid, dodecylbenzenesulphonic acid (DBSA), acetic acid, trichloroacetic acid, trifluoroacetic acid, formic acid, (1R)-(–)-10-camphorsulfonic acid, (1S)-(+)-10-camphorsulfonic acid (CSA), 2-acrylamido-2-methyl-1-propanesulfonic acid (AMPSA), and methanesulfonic acid ($CH_3SO_3H$), carboxylic acids, etc. It is also possible to use a mixture of these protonic acids. Also Lewis acids can be used. The invention is not limited to the use of the above-mentioned acids.

The oxidative agent used in the process according to the present embodiments may be any conventional oxidizer used in the polymerization of aniline. Exemplary oxidizing agents include ammonium peroxydisulfate (APS), persulfated salts such as, potassium persulfate, perchlorated salts such as potassium perchlorate, chlorinated salt such as potassium chlorinate, iodonated salt such as potassium iodonate, chlorinated iron such as ferric chloride, halogenated metal acids such as chloroaurate acid, fuming sulfuric acid, and ozone, particularly from APS, $K_2Cr_2O_7$, $KIO_3$, $FeCl_3$, $KMnO_4$, $KBrO_3$, $KClO_3$, peracetic acid or hydrogen peroxide. The reduced oxidant may remain in the resulting polymer nanofibers, as for example, iron or gold nanoparticles.

The polymerization temperature in the process of the present embodiments may vary within a range from –10 to 60° C. Similarly, the pH of the reaction solution is preferably maintained at a pH value of below about 1. However, nanofibers can also be produced at a pH value of 1 or above.

As detailed above, the membrane is used to steadily control the release of aniline and/or oxidant into the other solution to form polyaniline nanostructures. In conventional bulk polymerization methods, the aniline monomer is typically present in the reaction solution at a molar concentration of about 0.3 to 0.6. In the specific embodiments herein wherein the aniline diffuses through the membrane to react with the oxidant (thus making the oxidant solution the site of the reaction), there may be a much lower concentration of aniline in the reaction solution, for example on the order of about 0.001 to about 0.01 M, preferably about 0.008 M. Alternately, if the oxidant is the species that diffuses through the membrane (thereby making the aniline solution the site of reaction), then the concentration of oxidant in the reaction solution may fall within the above ranges.

This low concentration is achieved in these embodiments by the slow diffusion of aniline (or oxidant) across the membrane. Aniline can be used directly or dissolved in any acid solutions or in any organic solvents with any concentrations. In the embodiment below, this low concentration is achieved by the introduction of much smaller amounts of aniline into the reaction chamber. The amount of oxidant initially present in solution prior to polymerization relative to the amount of aniline initially present in solution is not critical, but applicants have found that a preferred molar ratio of aniline to oxidant is 1:1. It has been found that stirring or otherwise agitating the reaction mixture during polymerization may be desirable in some instances to produce nanofibers having specific characteristics.

in the first embodiment the characteristics of the resulting polymer nanofibers (including diameter and morphology) can be controlled to a certain degree by the selection of acid to be added to the reaction mixture as well as the temperature at which the polymerization is carried out and the inclusion of a surfactant.

In the first embodiment suitable surfactants that may be used in the reaction system include anion surfactants such as sodium dodecylsulfate, cation surfactants such as dodecyltrimethylammoniumbromide, and nonionic surfactants such as Triton® X-100. When included, the concentration of surfactant in the reaction mixture may range from, e.g., 0.0001 M to 1 M.

The resulting doped polymer can be dedoped with a base to produce a non-electroconductive polyaniline product (emeraldine base) with electrical conductivity less then $10^{-5}$ S/cm, which can be re-doped with a suitable acid to produce an electroconductive polymer with the desired properties. By this dedoping and redoping process, it is possible to control the electro-conductive properties of the polymer nanofibers continuously over the full range from that of an electrical insulator (conductivity<$10^{-10}$ S/cm) to that of a semiconductor (conductivity ~$10^{-5}$ S/cm) to that of a good conductor of electricity (conductivity ~1 S/cm) to that of a metal (conductivity>$10^{+2}$ S/cm).

In a second embodiment, bulk polymerization of aniline or substituted aniline monomer is conducted at very low concentration of aniline monomer. This is accomplished by introducing aniline monomer solution into an oxidant solution (or vice versa) and polymerizing at very low concentrations. Suitable concentrations may be tens of millimoles or lower and preferably from 0.001 to 0.01 M. Applicants have found that this low concentration allows the production of polyaniline nanofibers. Applicants have found that this low concentration coupled with the effect of minimal or not stirring or agitating the reaction mixture during the polymerization, allows the production of polyaniline nanofibers of increased length. However, it has been found that stirring or otherwise agitating the reaction mixture during polymerization may be desirable in some instances to produce nanofibers having specific characteristics.

In this second embodiment, a typical bulk polymerization reaction apparatus may be used. This typically consists of a reaction chamber, which in its simplest form may be a beaker. An aqueous solution of protonic acid, oxidant(s) and, if necessary, other agents are added into the reaction chamber. Oxidant(s) can be dissolved in an acid solution for example in the mixing tank. A commonly used oxidant is APS. Also other oxidants can be used. Protonic acid makes the polymerizing medium acidic, thereby making the polymerization reaction possible. Protonic acid also acts as a so-called dopant which donates the counter anion and forms a salt with the polyaniline base. Suitable acids are described above.

The actual polymerization takes place by feeding monomer(s), e.g. aniline into the process. Dissolved into a suitable medium, such as an aqueous acid solution, aniline is supplied to the reaction chamber. Depending on the temperature of the reaction mixture, the polymerization takes place over the course of several hours. While stirring is typically used in the polymerization of aniline and can be performed in the present process, applicants have found that longer and less branched fibers are possible if the mixture is subjected to minimal stirring or otherwise not agitated. Polymerized aniline precipitates to the bottom of the reaction chamber, which can then be collected and purified.

The amount of oxidant initially present in the reaction solution prior to polymerization relative to the amount of aniline initially present in the reaction solution is not critical, with the initial molar ratio of aniline to oxidant ranging from 50:1 or greater down to 0.02:1. More preferred molar ratios are from 10:1 to 0.1:1 and even 4:1 to 1:1. A particularly suitable molar ratio of aniline to oxidant is 1.5:1.

In the second embodiment the characteristics of the resulting polymer nanofibers (including diameter and morphology) can be controlled to a certain degree by the selection of acid to be added to the reaction mixture as well as the temperature at which the polymerization is carried out and the inclusion of a surfactant.

In the second embodiment suitable surfactants that may be used in the reaction system include anion surfactants such as sodium dodecylsulfate, cation surfactants such as cetyltrimethylammoniumbromide, and nonionic surfactants such as Triton® X-100. When included, the concentration of surfactant in the reaction mixture may range from, e.g., 0.0001M to 1 M.

The polymer nanofiber networks so made can be used for chemical, biological, environmental or medical sensors.

Figure 12:
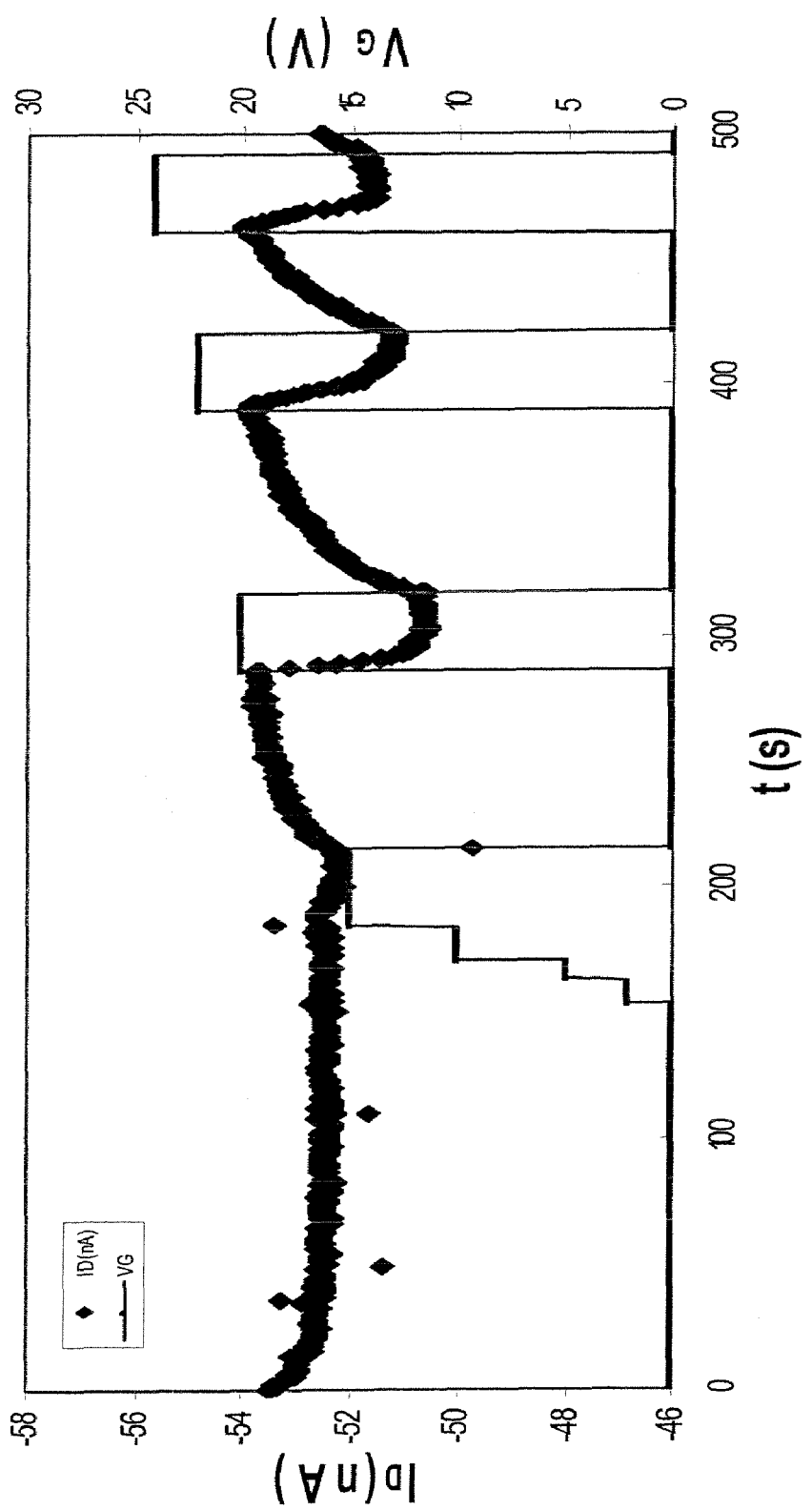
FIG. 12 is a graph showing the conductance change of nanofibers upon applying gate voltages in a field effect device based on polyaniline nanofibers.

The nanofiber networks also can be used as the active channel of a field effect device. FIG. 12 is a graph showing the conductance change of nanofibers upon applying gate voltages in a field effect device based on polyaniline nanofibers in contact with source and drain electrodes. The nanofiber network is in contact with a dielectric polymer which is in contact with a gate electrode. Application of a gate voltage of less then 20 volts results in modulation of the electrical conductivity between source and drain electrodes.

The following examples are provided for purposes of describing the preferred embodiments. They should not be considered limiting of the invention.

EXPERIMENTAL

Example 1

Using Permeable Tubing

Aniline (Aldrich) was distilled under vacuum before use. Ammonium peroxydisulfate (APS; 99.99%, Aldrich) and methanesulfonic acid ($CH_3SO_3H$; 99.5%, Alfa Aesar) were used directly as received without further purification. Spectra/Por Dialysis Tubing, Regenerated Cellulose (MWCO 3500 and MWCO 12 k-14 k) and Spectra/Por Closures were purchased from Spectrum Laboratories, Inc.

Aniline (150 mg) was dissolved in 3 mL of 1M methanesulfonic acid ($CH_3SO_3H$) solutions, and carefully transferred to Dialysis Tubing (MWCO 3500) sealed with Spectra/Por Closures. The sealed Dialysis Tubing was put into a 400 mL beaker with the solution of ammonium peroxydisulfate (184 mg) dissolved in 200 mL of 1M methanesulfonic acid ($CH_3SO_3H$) solution. The reaction was carried out at room temperature without any disturbance. After 24 hours, precipitated dark-green polyaniline on the bottom of the beaker was collected and purified by dialysis with deionized water (Dialysis Tubing, MWCO 12 k-14 k). Doped polyaniline nanofibers were dedoped by dialysis with 0.1 M $NH_4OH_{(aq)}$, and then redoped by dialysis with 0.5M $HCl_{(aq)}$.

After purification with deionized water, the dark green polyaniline nanofibers in the dialysis tubing were diluted with deionized water and examined by scanning electron microscopy (SEM, Philips XL-30 ESEM) and transmission electron microscopy (TEM, Philips CM-200). As shown in FIG. 1a (SEM), and FIG. 1b (TEM), the polyaniline precipitate presents nanofibrous structures with diameters ranging from 30 nm to 80 nm, confirmed via TEM. FIG. 1 also shows that polyaniline nanofibers are of the interconnected, branched and networked morphology. However, after dilution of the colloid suspension of polyaniline nanofibers with a large amount of deionized water, some single polyaniline nanofibers can be isolated from the agglomeration as shown in the inset SEM image (b) of FIG. 2. This indicates that this kind of polyaniline nanofibers can be potentially used to fabricate nanoelectronic devices such as field-effect devices, which are under investigation. In addition, polyaniline nanofibers formed within the Dialysis Tubing show similar nanostructures as these found outside.

Figure 2:
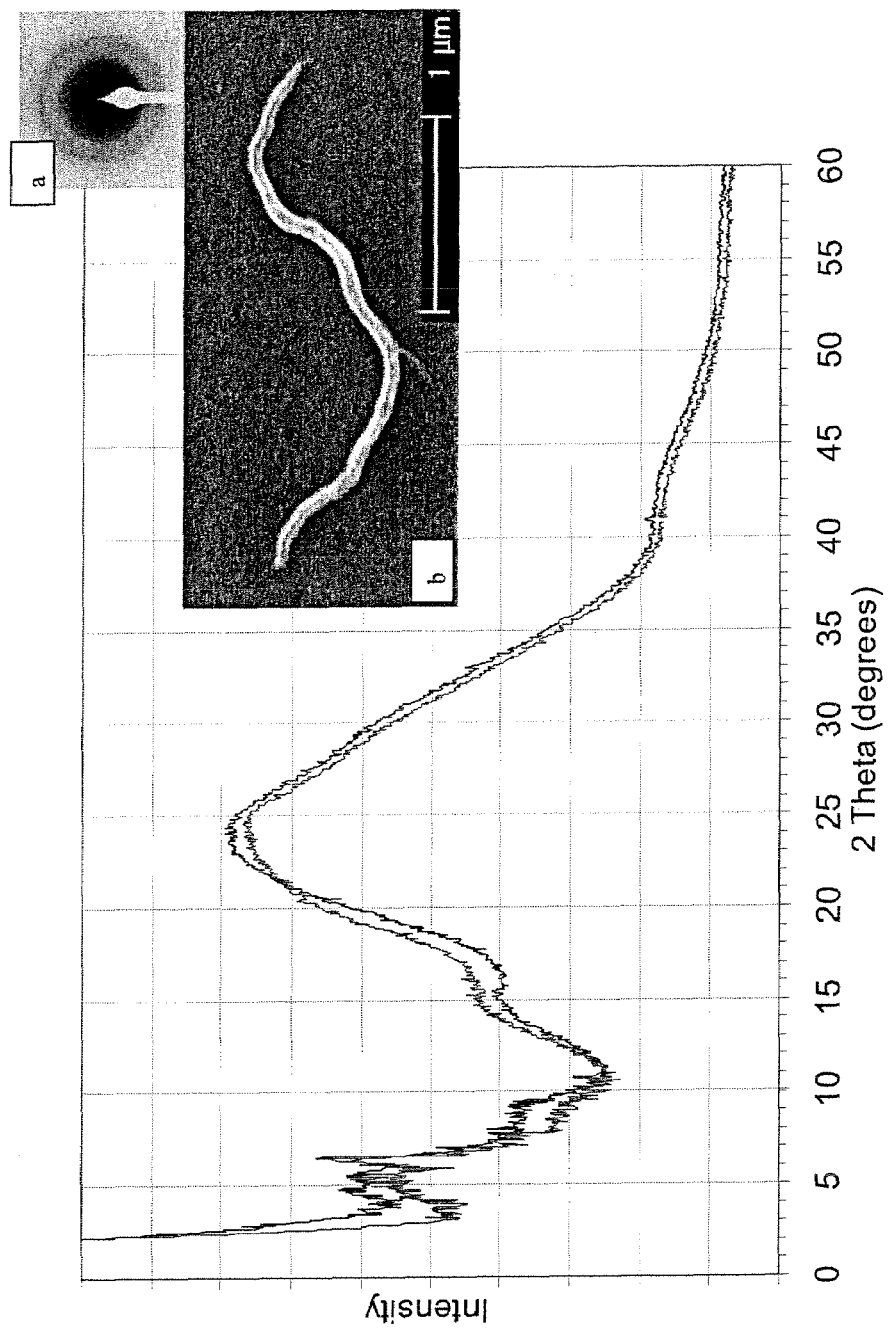
FIG. 2 is XRD patterns of polyaniline nanofibers and Electron diffraction (inset image (a)) of a polyaniline/$CH_3SO_3^-$ nanofiber made by made by the first described method (inset image (b)).

FIG. 2 shows XRD patterns of polyaniline/$CH_3SO_3^-$ nanofibers and polyaniline/$Cl^-$ nanofibers, and the electron diffraction of the single polyaniline/$CH_3SO_3^-$ nanofiber (inset image a). Samples were dispersed in deionized water and deposited onto substrates. Electron diffraction was taken from the polyaniline nanofiber.

One broad band observed with $2\theta$ c.a. $24°$ shows that polyaniline/$CH_3SO_3^-$ nanofibers are disordered as shown in the pink line of FIG. 2. Electron diffraction examining on the polyaniline/$CH_3SO_3^-$ nanofiber shown in the inset image (a) of FIG. 2 also verifies the disordered structure of the polyaniline/$CH_3SO_3^-$ nanofiber. Moreover, after redoping with 0.5M $HCl_{(aq)}$, polyaniline/$Cl^-$ nanofibers obtained appear similar in the XRD pattern with $2\theta$ c.a. $24°$ as shown in FIG. 2. The inset image (b) taken by SEM, scale bar=1 µm.

Figure 3:
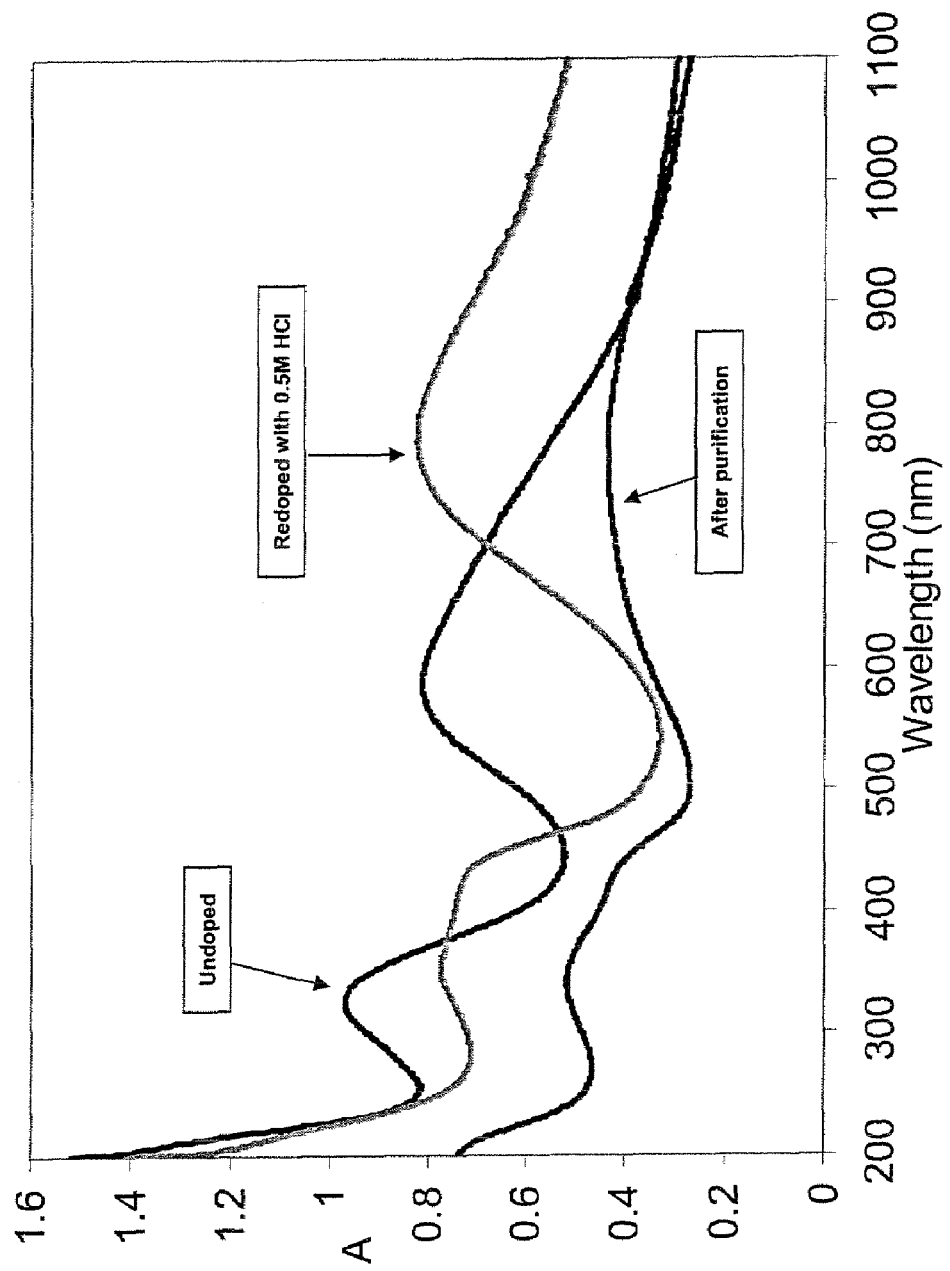
FIG. 3 is a UV/vis spectra of polyaniline nanofibers made by the first described method dispersed in deionized water after purification, after dialysis with 0.1M $NH_4OH_{(aq)}$ and after dialysis with 0.5M $HCl_{(aq)}$.
Figure 4:
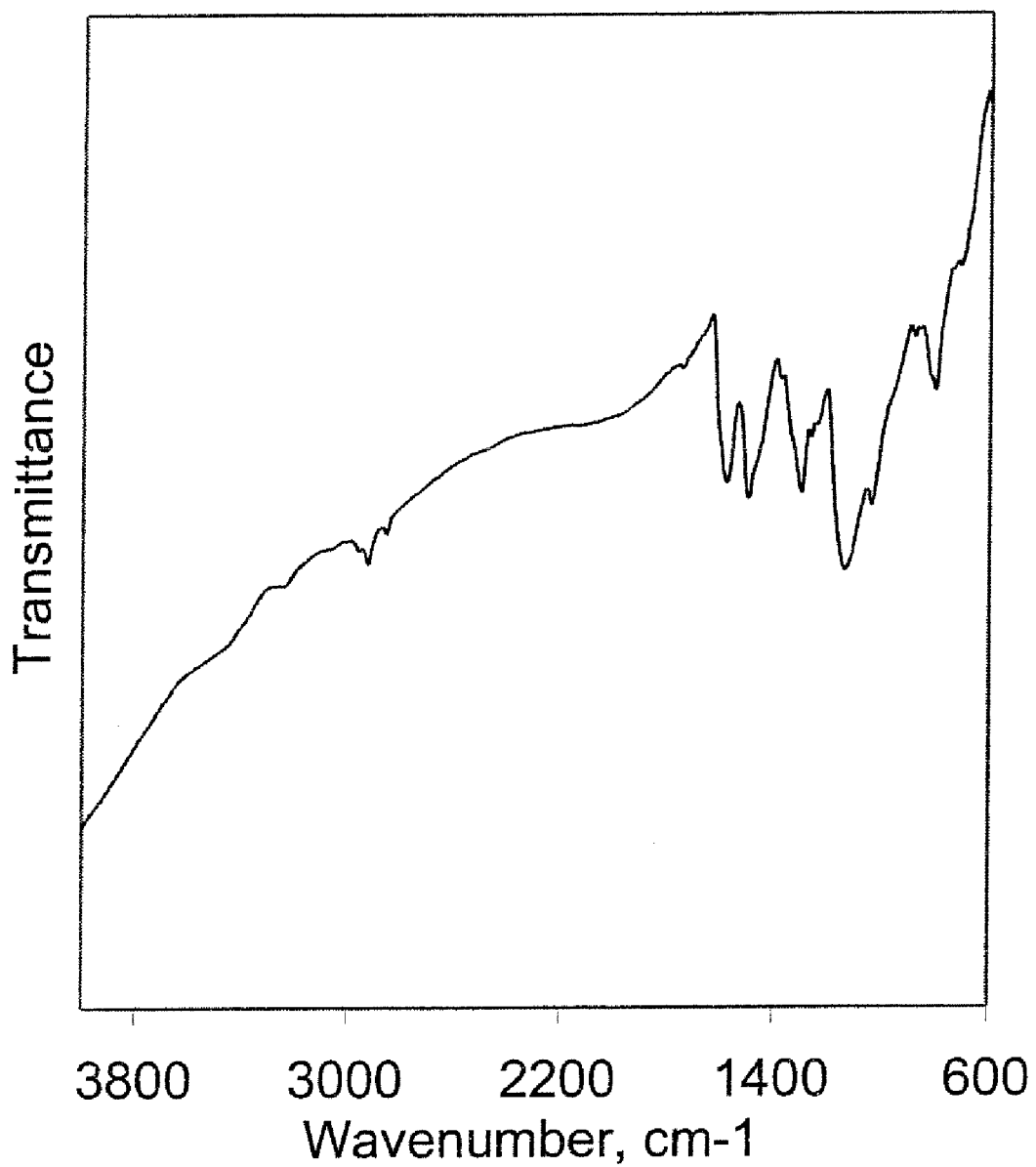
FIG. 4 is an FTIR spectrum of polyaniline/$CH_3SO_3^-$ nanofibers made by the first described method showing five major vibration bands: 1574, 1490, 1294, 1132 and 796 cm$^{-1}$.

UV/vis absorption spectra demonstrate that polyaniline nanofibers obtained have different absorption patterns corresponding to oxidation and reduction states as shown in FIG. 3. The absorption peaks for both polyaniline nanofiber salts and emeraldine base are consistent with previously reported results for bulk (nonfibrous) polyaniline. This supports the presence of the same chemical structure for nanofibrous polyaniline and granular polyaniline. Furthermore, it is noted that solid-state FTIR spectrum of polyaniline nanofibers provides excellent agreement with previous studies of nonfibrous polyaniline as shown in FIG. 4. It is interesting that polyaniline nanofibers can be easily dispersed in deionized water to form homogeneous solutions as shown in the inset image of FIG. 3.

Figure 5:
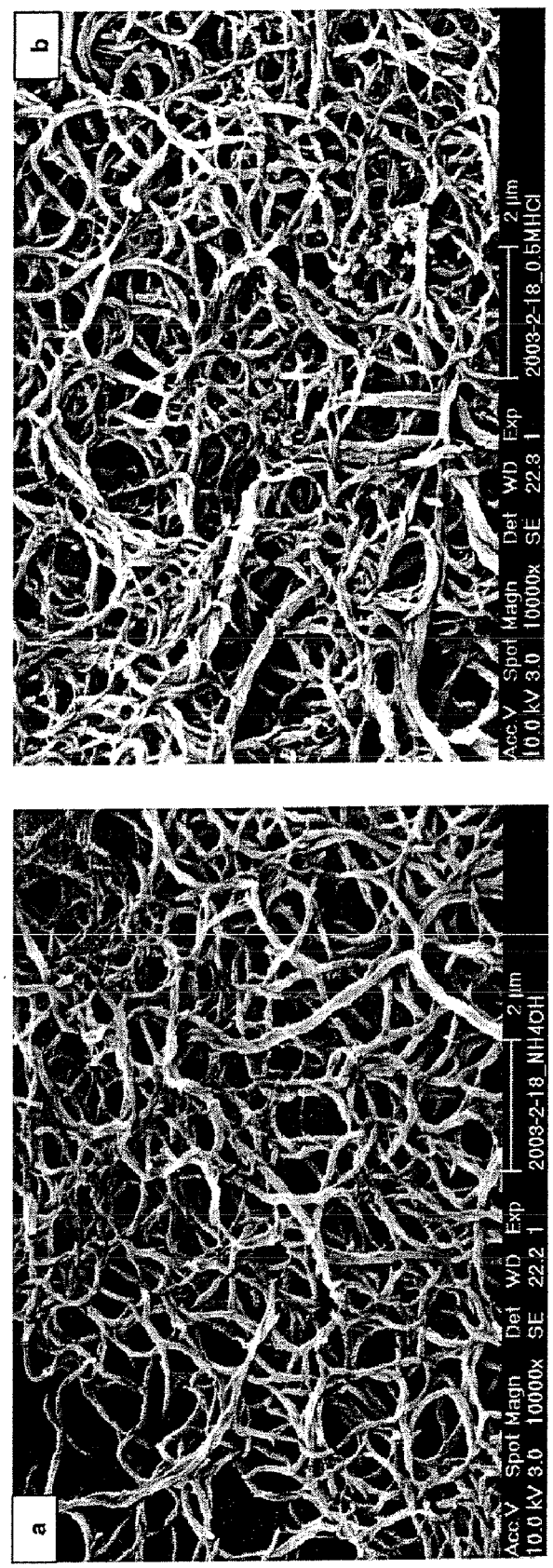
FIG. 5 are Scanning electron micrograph (SEM) of polyaniline nanofibers made by the first described method deposited on Si-wafer substrates.

Scanning electron micrograph (SEM) of polyaniline nanofibers deposited on Si-wafer substrates (a) dedoped with 0.1M $NH_4OH_{(aq)}$ (b) redoped with 0.5M $HCl_{(aq)}$ are shown in FIG. 5. In these micrographs, polyaniline nanofibers dispersed in deionized water were deposited on the substrates for examination. The nanofibrous structures show no significant change after dedoping and redoping as shown in SEM's of FIG. 5. This indicates that polyaniline nanofibers are very stable upon the treatment with acid and base solutions.

The bulk conductivity of polyaniline nanofibers formed is obtained in the range of ~0.89 S/cm from the 4-probe DC measurement at room temperature, $24°$ C., for polyaniline/$CH_3SO_3$ nanofibers deposited on a glass slide to form a dark green film, and then four Au electrodes deposited by thermal evaporation to form the contacts.

In summary, polyaniline nanofibers are produced via a novel technique. The branch and network nanostructures are demonstrated through both scanning and transmission electron microscopy. The average diameters of polyaniline nanofibers range from 30 nm to 80 nm, confirmed via transmission electron microscopy. UV/vis and FT-IR spectra of polyaniline nanofibers are consistent with the spectra of polyaniline powders prepared by the traditional chemical synthesis. XRD and electron diffraction indicate that polyaniline nanofibers formed are disordered. The nanofibrous morphology has no significant change with doping/dedoping by the treatment with acid/base solutions. The room temperature bulk conductivity of polyaniline/$CH_3SO_3^-$ nanofibers ($\sigma$~0.89 S/cm) is reported with 4-probe DC measurement.

Example 2

Using Low Concentration Bulk Polymerization

Aniline was dissolved in a small portion of 1M dopant acid solution, and carefully transferred to a solution of ammonium peroxydisulfate (APS) dissolved in 1M dopant acid solution in the beaker. The reaction was carried out at room temperature without any disturbance. After 24 hours, the dark-green polyaniline precipitate was collected to Dialysis tubing (MWCO 12 k-14 k), and then purified by dialysis with deionized water. The varied concentrations of aniline were used to study the formation of polyaniline nanofibers, including [aniline]=0.008M, 0.016M, 0.064M and 0.128M. The molar ratio of aniline and APS was kept at 2:1. A variety of acids were used, such as HCl, (1S)-(+)-10-camphorsulfonic acid (CSA), 2-acrylamido-2-methyl-1-propanesulfonic acid (AMPSA), methanesulfonic acid ($CH_3SO_3H$), and $HClO_4$, etc. Polymerization was also investigated at temperature of 0 to $5°$ C. (ice bath) as well as under mechanical stirring.

Samples deposited onto the Si-wafer substrates and then sputtered with a thin layer of Au/Pd were used for studies of scanning electron microscopy (SEM, Philips XL-30 ESEM). Samples dispersed in deionized water were transferred to copper grids for the examination of transmission electron microscopy (TEM, Philips CM-200 or Philips TF-20). UV/vis absorption was studied from UV/VIS/NIR Spectrometer (PERKIN ELMER Lambda 19) employed the dispersion of samples in deionized water.

Figure 6:
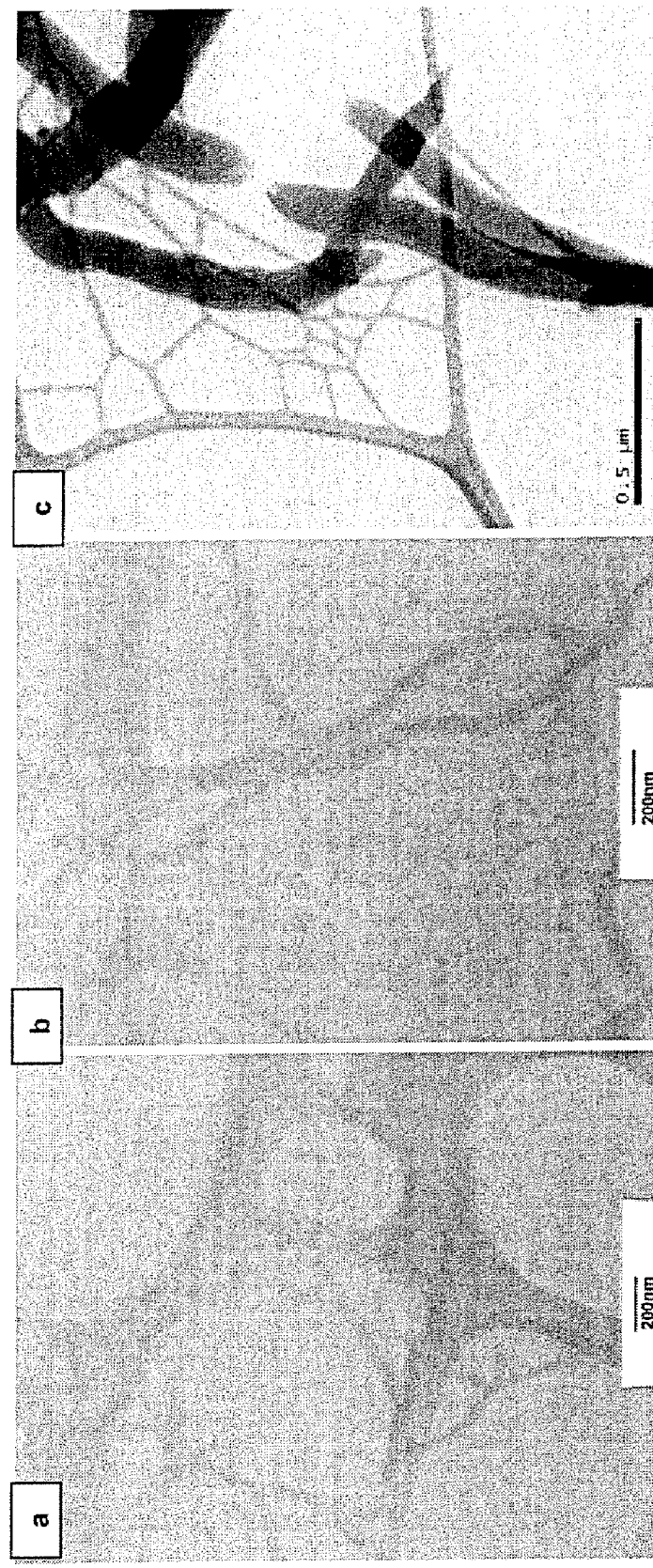
FIG. 6 are transmission electron micrograph (TEM) of polyaniline nanofibers made by the second described method obtained in different dopant acids.

Polyaniline nanofibers were successfully obtained through the traditional bulk polymerization without any aid of specific templates. FIG. 6 shows Transmission electron micrograph (TEM) of polyaniline nanofibers obtained in different dopant acids at [aniline]=0.008M and $24°$ C. without mechanical stirring (a) CSA (scale bar=200 nm) (b) $CH_3SO_3H$ (scale bar=200 nm) (c) $HClO_4$ (scale bar=500 nm). As shown in FIG. 6, TEM images obtained show nanofibrous structures of polyaniline. The sizes of polyaniline nanofibers vary depending on the synthesis conditions. As shown in FIG. 1(a), polyaniline nanofibers obtained from $CSA_{(aq)}$ present smaller diameters ranging from 17 nm to 50 nm (based on TEM measurement). The diameters of polyaniline nanofibers synthesized in $CH_3SO_3H_{(aq)}$ rang from 42 nm to 70 nm (based on TEM measurement) as shown in FIG. 1(b). In addition, FIG. 1(c) shows larger diameters of polyaniline nanofibers obtained from $HClO_{4(aq)}$ varying from 72 nm to 230 nm (based on TEM measurement). Therefore, the diameters of polyaniline nanofibers can be controlled directly by the dopant acids used.

Figure 7:
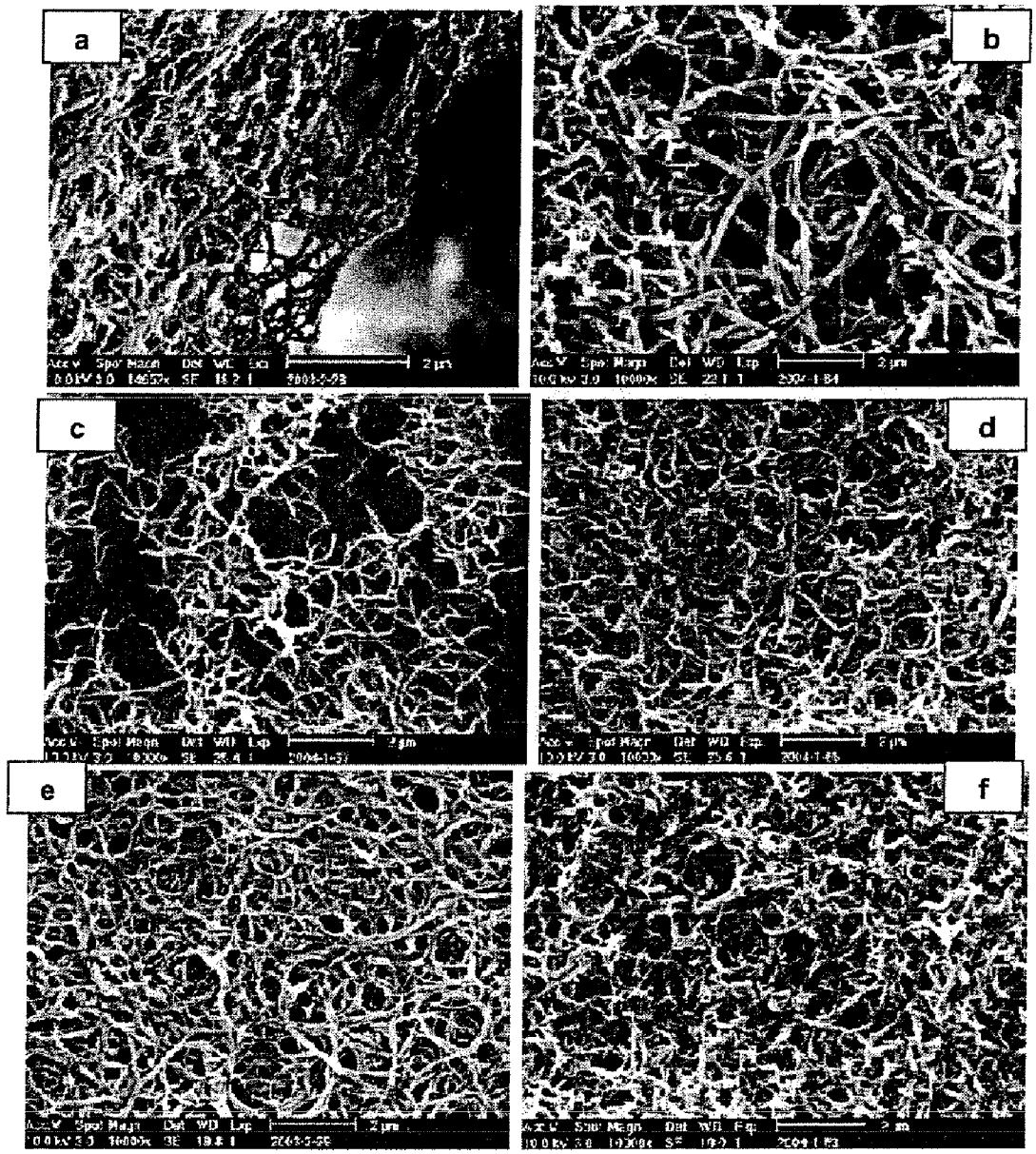
FIG. 7 are SEM images of polyaniline nanofibers made by the second described method synthesized in different dopant acids.

FIG. 7 shows SEM images of polyaniline nanofibers synthesized in different dopant acids including $CSA_{(aq)}$ (a), $HClO_{4(aq)}$ (b), $HCl_{(aq)}$ (c), $AMPSA_{(aq)}$ (d), and $CH_3SO_3H_{(aq)}$ (e) at an aniline initial concentration of 0.008 M at 24° C. It is clear that the network and branch morphologies of polyaniline nanofibers have no significant change using different dopant acids for polymerization media. However, it is interesting that polyaniline nanofibers made in $HClO_{4(aq)}$ produce more linear nanofibrous structures than those made in others, albeit its average diameter is largest among the dopant acids used. In addition, polymerization temperature affects the formation of polyaniline nanofibers, as shown in FIG. 7(e) and FIG. 7(f).

Polyaniline/$CH_3SO_3^-$ synthesized directly at 0° C. has smaller nanofibrous structures than those fibers synthesized directly at 24° C.

Figure 8:
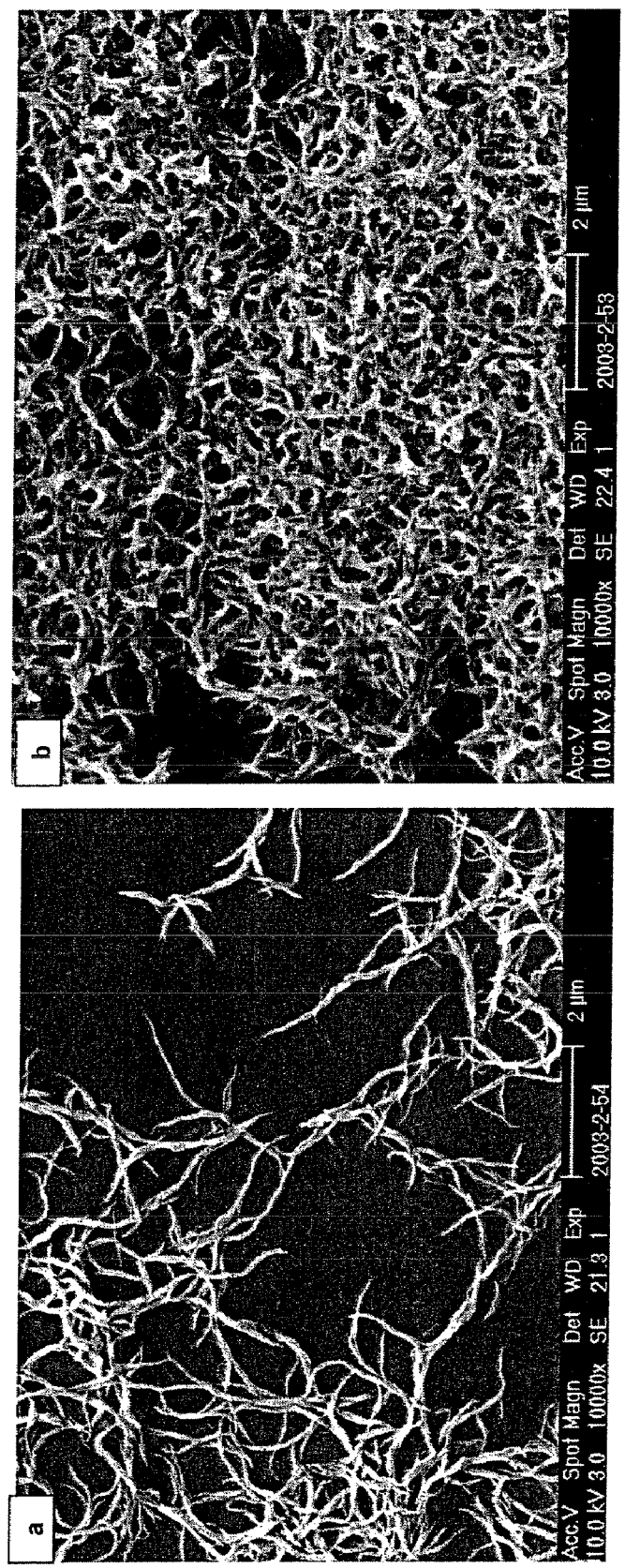
FIG. 8 shows scanning electron micrograph (SEM) of polyaniline/$CH_3SO_3^-$ nanofibers obtained via made by the second described method (bulk polymerization) at 24° C. (a) without mechanical stirring and (b) with mechanical stirring.

During polymerization, the reaction kept still, i.e. without disturbance, has a preference to the formation of polyaniline nanofibers over stirring. This is demonstrated in FIG. 8, which shows scanning electron micrograph (SEM) of polyaniline/$CH_3SO_3$— nanofibers obtained in [aniline]=0.016M and [APS]=0.008M at 24° C. (a) without mechanical stirring and (b) with mechanical stirring. As presented in FIG. 8, polyaniline nanofibers synthesized without mechanical stirring (FIG. 8(a)) are longer in length than those synthesized with mechanical stirring (FIG. 8 (b)). The concentration of aniline used is also an important factor to control the morphology of polyaniline nanofibers.

Figure 9:
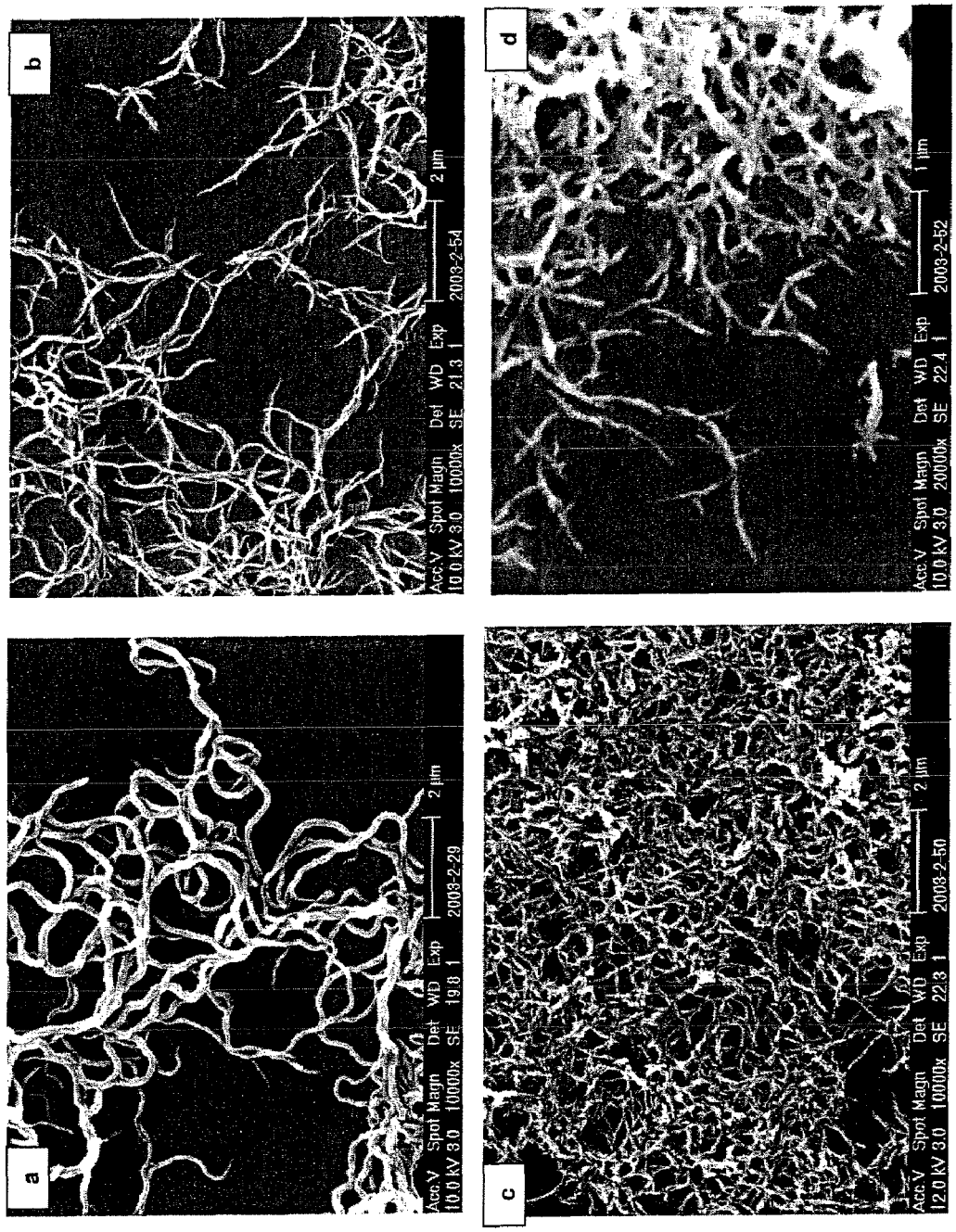
FIG. 9 are SEM images of polyaniline nanofibers made by the second described method made in different concentration of aniline.

FIG. 9 shows SEM images of polyaniline nanofibers made in different concentrations of aniline at 24° C. without stirring. These concentrations are (a) [aniline]=0.008M (b) [aniline]=0.016M (c) [aniline]=0.064M and (d) [aniline]=0.128M. Low concentration of aniline has a tendency to form longer and less branched polyaniline nanofibers as shown in FIG. 4(a). However, the average size of polyaniline nanofibers obtained increases as the concentration of aniline decreases.

As mentioned above, the morphology of polyaniline nanofibers depends on the conditions of polymerization. Briefly, FIG. 8(b), and FIG. 9(c)-(d) show that polymerization with mechanical stirring and high concentration of aniline, respectively, are disadvantageous to the formation of polyaniline nanofibers. This correlates with conventional bulk polymerization using high concentration of aniline with mechanical stirring forming granular polyaniline.

Figure 10:
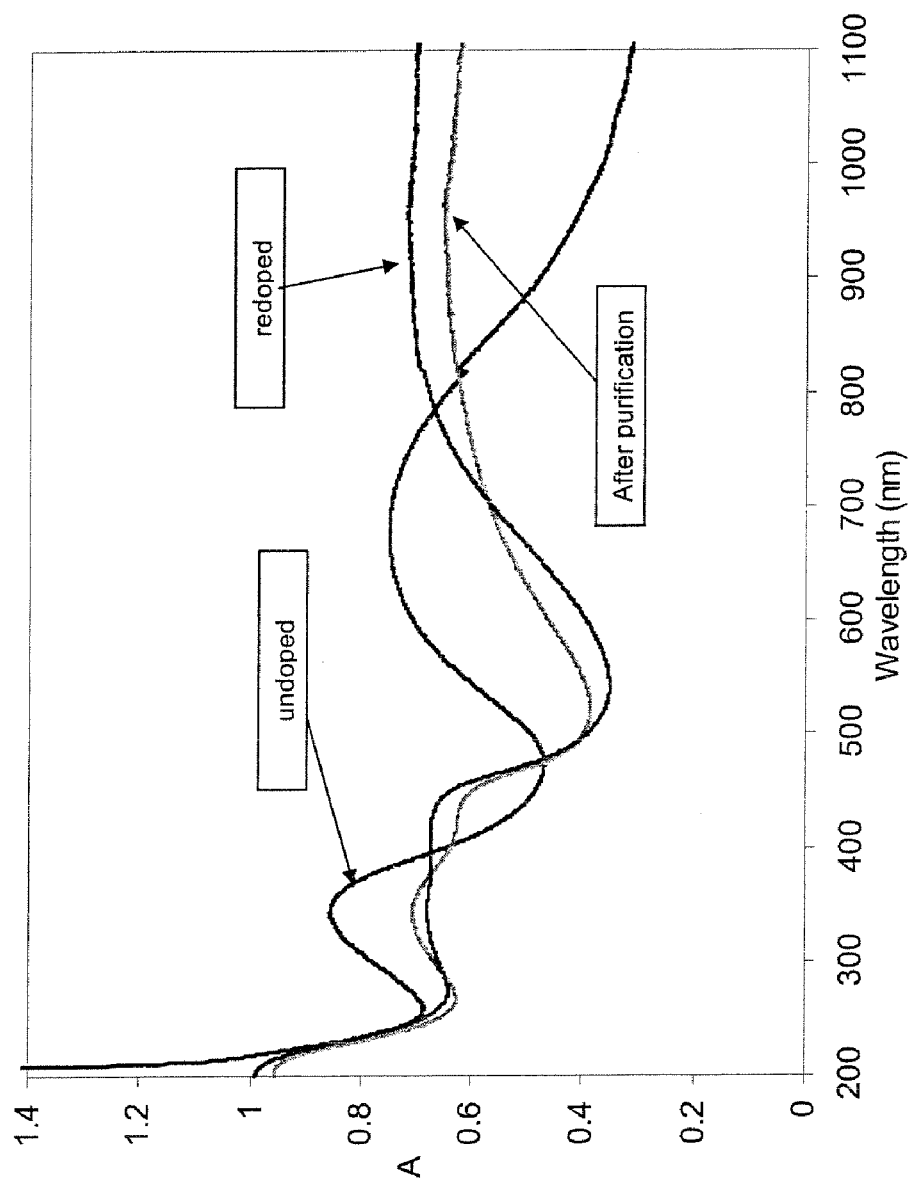
FIG. 10 is a UV/vis absorption spectra of polyaniline/$ClO_4^-$ nanofibers made by the second described method.

Polyaniline/$ClO_4^-$ nanofibers were dispersed in deionized water by vigorously shaking with a hand for the characterization of UV/vis absorption. FIG. 10 shows UV/vis absorption spectra of polyaniline nanofibers made by $HClO_4$ (aq). After purification by dialysis against deionized water, polyaniline nanofibers present three absorption peaks c.a. 338 nm, 430 nm and 960 nm with a free carrier tail as shown in the bright green line of FIG. 5. With adding one drop of dilute 70% w/w $HClO_{4(aq)}$ to polyaniline nanofiber dispersion (bright green line), the absorption intensity of the peak at c.a. 338 nm decreases following the increase of the absorption intensity of the peak at c.a. 430 nm and 960 with a free carrier tail as shown in the green line of FIG. 5. It is possible that the purification of polyaniline nanofibers by dialysis with deionized water results in removal of the dopant, $ClO_4^-$, within polyaniline backbone to form partially doped polyaniline nanofibers. Furthermore, adding a drop of 30% w/w $NH_4OH_{(aq)}$ to polyaniline/$ClO_4^-$ nanofibers dispersion (green line) introduces the formation of an absorption band c.a. 677 nm, simultaneously resulting in disappearance of two absorption bands c.a. 430 nm and 960 nm with a free carrier tail as shown in the blue line of FIG. 5. Two strong absorption bands c.a. 338 nm and 677 nm is attributed to the formation of emeraldine base. The UV/vis absorption patterns of polyaniline nanofibers obtained are consistent with previously reported results.

In summary, polyaniline nanofibers were successfully synthesized using conventional bulk polymerization. With the appropriate control of polymerization conditions by using very dilute concentration of aniline with modest, little or no disturbance, polyaniline will favorably form nanofibrous structures. Polymerization in different dopant acids produces similar morphology of polyaniline nanofibers. The size of polyaniline nanofibers is tunable under the appropriate selection of dopant acids. UV/vis absorption shows that polyaniline nanofibers have the same absorption patterns with previous as reported for nonfibrous polyanilines.

Figure 11:
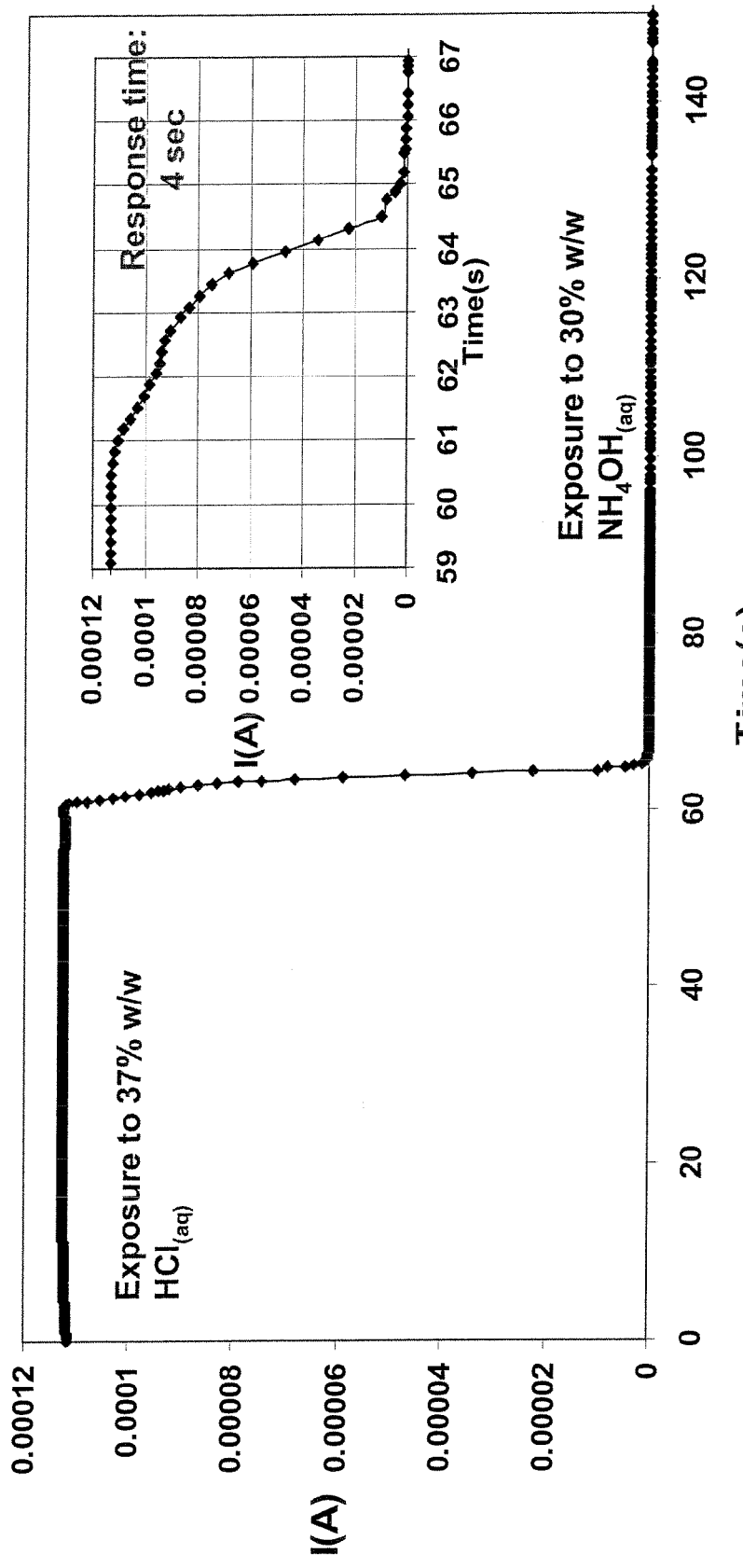
FIG. 11 is an example of a sensor based on polyaniline nanofiber network prepared by the methods described herein.

Sensors based on polyaniline nanofiber network can be prepared by the methods described herein. For particular sensor shown in FIG. 11 the polyaniline nanofiber network was assured to be fully doped and highly conducting by exposure to 37% w/w aqueous HCl. The fiber network placed on a substrate was then exposed to vapor from a drop of 30% w/w aqueous $NH_4OH$ placed several cm from the nanofiber network. The resistance of the nanofiber network increases over many orders of magnitude in a few seconds. Substantial increase in the nanofiber network resistance occurs in less then one second.

Field effect device based on polyaniline nanofibers in contact with source and drain electrodes have been demonstrated. FIG. 12 is a graph showing the conductance change of nanofibers upon applying gate voltages in a field effect device based on polyaniline nanofibers. In this example, the nanofiber network with source and drain electrodes affixed is also in contact with a dielectric polymer which is in contact with a gate electrode. Application of a gate voltage of less then 20 volts results in modulation of the electrical conductivity between source and drain electrodes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A process for forming nanofibers of polyaniline or a substituted polyaniline including the steps of:
   providing a first solution containing aniline monomer or substituted aniline monomer; providing a second solution containing an oxidant; adding said first solution to said second solution to form an aqueous reaction mixture, wherein one of the first or second solutions contain an acid, wherein said aniline monomer or substituted aniline monomer and said oxidant are present in a concentration of 0.01 M or lower; and polymerizing said aniline monomer or substituted aniline monomer to form polymer nanofibers.

2. A process according to claim 1, wherein said steps are performed without stirring or agitation of the reaction mixture.

3. A process according to claim 1, wherein said steps are performed with stirring and/or agitation of the reaction mixture.

4. A process according to claim 1, wherein at least one of said first and second solutions further comprises an acid comprising one or more of: hydrochloric acid, hydrogen bromide, sulfuric acid, perchloric acid, nitric acid, phosphoric acid, phosphonic acid, trifluoromethanesulphonic acid, toluenesulphonic acid, dodecylbenzenesulphonic acid, carboxylic acids, acetic acid, trichloroacetic acid, trifluoroacetic acid, formic acid, (1R)-(−)-10-camphorsulfonic acid, (1S)-(+)-10-camphorsulfonic acid, 2-acrylamido-2-methyl-1-propanesulfonic acid, and methanesulfonic acid.

5. A process according to claim 4, wherein said polymer nanofibers have diameters ranging from 10 nm to 500 nm.

6. A process according to claim 5, wherein said polymer nanofibers have diameters ranging from 17 nm to 230 nm.

7. A process according to claim 1, wherein diameters of said polymer nanofibers can be controlled by the selection of acid.

8. A process according to claim 1, wherein the morphology of said polymer nanofibers can be controlled by the temperature at which polymerization is carried out.

9. A process according to claim 1, wherein the morphology of said polymer nanofibers can be controlled by the addition of a surfactant to at least one of said first solution, said second solution, and said reaction solution.

10. A process according to claim 9, wherein the surfactant is selected from among anion surfactants such as sodium dodecylsulfate, cation surfactants such as dodecylltrimethylammoniumbromide, and nonionic surfactants such as Triton® X-100.

11. A process according to claim 9, wherein the surfactant concentration is in the range of 0.0001M to 1 M.

12. A process according to claim 1, wherein said substituted aniline monomer comprises:

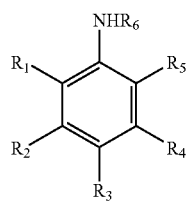

wherein, $R_1$, $R_2$, $R_3$, $R_4$, $R_5$, and $R_6$ are independently selected from the group consisting of: hydrogen atom, alkyl, alkoxy, alkylsulfonyl, arylsulfonyl, halogen, alkoxycarbonyl, alkythio, alkylsulfuryl, cycloalkyl, sulfonic, aryl or carboxylic substituted alkyl substituents.

13. A process according to claim 12, wherein said substituted aniline monomer comprises one or more of: 2-aminobenzenesulfonic acid, 3-aminobenzenesulfonic acid, orthanilic acid, o-toluidine, m-toluidine, o-anisidine, m-anisidine, 2-fluoroaniline, 2-chloroaniline, 2-bromoaniline, 2-iodoaniline, 3-fluoroaniline, 3-chloroaniline, 3-bromoaniline, and 3-iodoaniline.

14. A process according to claim 1, wherein said oxidative agent comprises one or more of: ammonium peroxydisulfate, persulfated salts, perchlorated salts, chlorinated salt, iodonated salt, chlorinated iron, halogenated metal acids, fuming sulfuric acid, and ozone.

15. A process according to claim 1, wherein said polymerization step is conducted at a temperature of from −10 to 60° C.

16. A process according to claim 1, wherein a concentration of monomer in said reaction solution is from 0.001 to 0.01 M.

17. A process according to claim 16, wherein said concentration is about 0.008 M.

18. A process according to claim 1, further comprising the step of dedoping the polymer nanofibers with a base to produce a non-electroconductive polymer product having an electrical conductivity less than $10^{-5}$ S/cm.

19. A process according to claim 18, wherein said base comprises $NH_4OH$.

20. A process according to claim 18, wherein a concentration of said base is 0.1 M.

21. A process according to claim 18, further comprising the subsequent step of re-doping the polymer product with a suitable acid to produce an electroconductive polymer having an electrical conductivity greater than $10^{-5}$ S/cm.

22. A process for dedoping and redoping a polymer nanofiber formed according to the process of claim 1 using electrochemical oxidation and reduction reactions.

23. A process according to claim 1, wherein the molar ratio of monomer to oxidant prior to polymerization is from 50:1 or to 0.02:1.

24. A process according to claim 23, wherein the molar ratio of monomer to oxidant prior to polymerization is from 4:1 to 1:1.

25. A process according to claim 24, wherein the molar ratio of monomer to oxidant prior to polymerization is about 1.5:1.

26. A process for forming nanofibers of polyaniline or a substituted polyaniline including the steps of:
providing a first solution containing aniline or substituted aniline monomer, dimer or oligomer, wherein the aniline or substituted aniline monomer, dimer or oligomer has up to eight repeating monomer units; providing a second solution containing an oxidant; adding said first solution to said second solution to form an aqueous reaction mixture, wherein one of the first or second solutions contain an acid, wherein said aniline or substituted aniline monomer, dimer or oligomer and said oxidant are present in a concentration of 0.01 M or lower; and polymerizing said aniline or substituted aniline monomer, dimer or oligomer to form polymer nanofibers, wherein the steps are performed without stirring or agitation of the reaction mixture.

* * * * *